(12) United States Patent
Nallapa et al.

(10) Patent No.: US 9,676,326 B2
(45) Date of Patent: Jun. 13, 2017

(54) DRIVE HISTORY PARKING BARRIER ALERT

(71) Applicant: Ford Global Technologies, LLC, Dearborn, MI (US)

(72) Inventors: Venkatapathi Raju Nallapa, Fairfield, CA (US); Harpreetsingh Banvait, Sunnyvale, CA (US); Scott Vincent Myers, Camarillo, CA (US); Ashley Elizabeth Micks, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/865,497

(22) Filed: Sep. 25, 2015

(65) Prior Publication Data

US 2017/0088052 A1     Mar. 30, 2017

(51) Int. Cl.
*B60Q 1/48* (2006.01)
*G01S 19/13* (2010.01)
*B60Q 9/00* (2006.01)
*G01S 13/04* (2006.01)
*G01S 17/02* (2006.01)

(52) U.S. Cl.
CPC ............. *B60Q 9/002* (2013.01); *G01S 13/04* (2013.01); *G01S 17/026* (2013.01); *G01S 19/13* (2013.01)

(58) Field of Classification Search
CPC .... B60Q 1/48; B60Q 9/02; G06G 7/78; G01S 13/04; G01S 19/13

USPC .................. 701/23, 301; 340/932.2
See application file for complete search history.

(56) References Cited

U.S. PATENT DOCUMENTS

| | | | | |
|---|---|---|---|---|
| 4,703,164 | A * | 10/1987 | von Ballmoos | G06Q 20/127 235/384 |
| 7,516,010 | B1 * | 4/2009 | Kaplan | G01C 21/30 340/932.2 |
| 8,229,664 | B2 | 7/2012 | Herbert | |
| 8,560,175 | B2 | 10/2013 | Bammert | |
| 2014/0347485 | A1 | 11/2014 | Zhang | |
| 2015/0035983 | A1 | 2/2015 | Niemz | |
| 2015/0231981 | A1 * | 8/2015 | Kees | G05D 1/0225 701/22 |
| 2016/0119587 | A1 * | 4/2016 | Tan | B60R 1/00 348/148 |
| 2016/0214535 | A1 * | 7/2016 | Penilla | G06Q 20/18 |

FOREIGN PATENT DOCUMENTS

DE        102012211637        1/2014

* cited by examiner

*Primary Examiner* — Tan Q Nguyen
(74) *Attorney, Agent, or Firm* — Stevens Law Group; David R. Stevens

(57) ABSTRACT

A driving assistance system includes a drive detection component, a presence component, and a notification component. The drive detection component is configured to determine that a vehicle or driver is exiting or preparing to exit a parking location. The presence component is configured to determine, from a drive history database, whether a parking barrier is present in front of or behind the parking location. The notification component is configured to provide an indication that the parking barrier is present to a human driver or an automated driving system of the vehicle.

20 Claims, 5 Drawing Sheets

DRIVE HISTORY PARKING BARRIER ALERT

TECHNICAL FIELD

The disclosure relates generally to methods, systems, and apparatuses for providing driver notifications or for autonomous driving vehicles, and more particularly relates to methods, systems, and apparatuses for safely exiting a parking stall.

BACKGROUND

Automobiles provide a significant portion of transportation for commercial, government, and private entities. Due to the high cost and value of automobiles and potential harm to passengers and drivers, driver safety and avoidance of collisions or accidents are extremely important.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
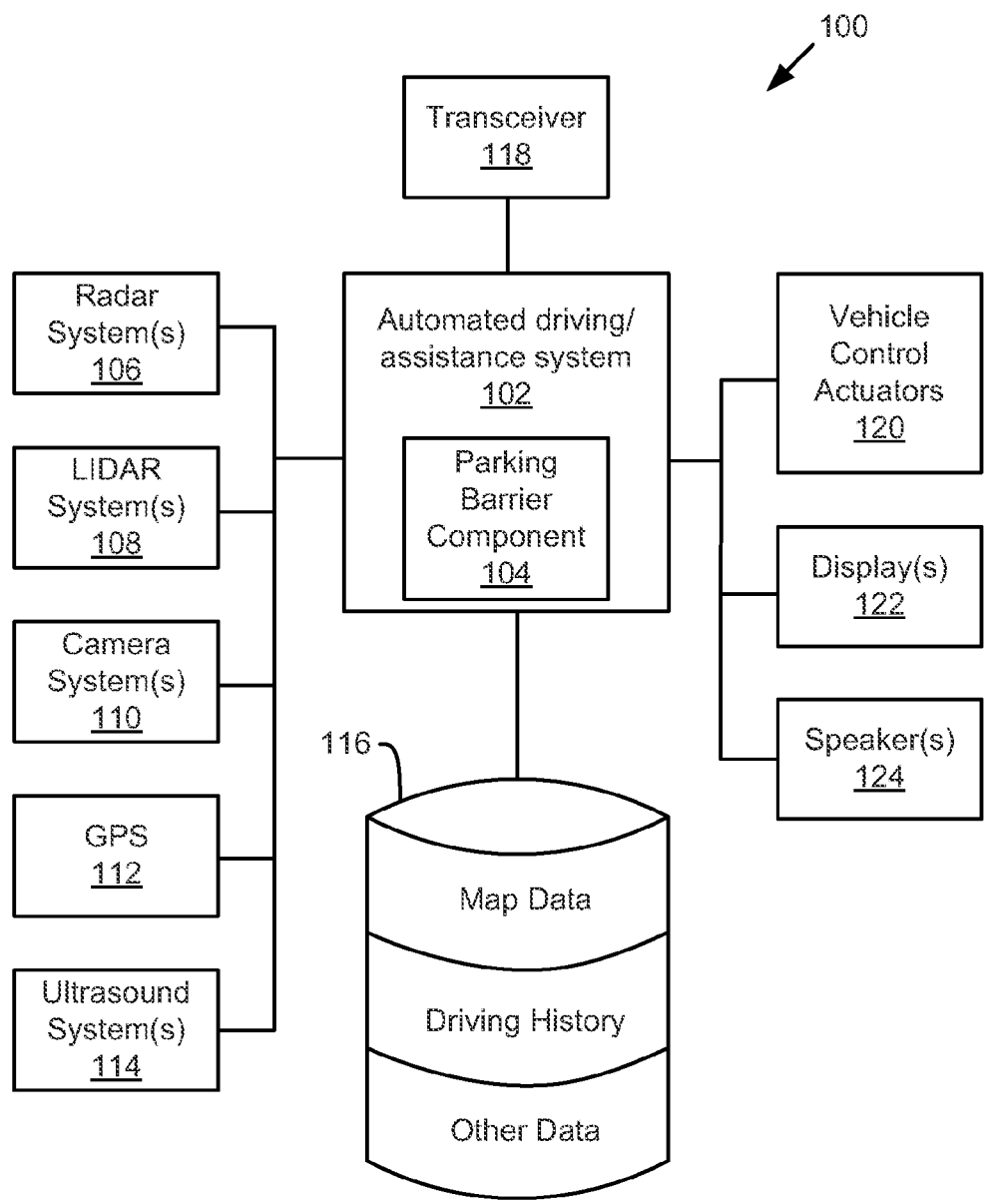
FIG. 1 is a schematic block diagram illustrating an implementation of a vehicle control system that includes an automated driving/assistance system.

A very common location for collisions or accidents for vehicles occurs during parking or leaving a parking location or parking stall. Because of the close range of other vehicles, pedestrians, or other objects, there tends to be a small margin for error if damage to vehicles, including scrapes to bumpers or side panels, is to be avoided. In many parking lots, or at other parking locations, parking stalls are marked or bounded on at least one side by some sort of parking barrier, such as a parking chock, curb, or the like. The parking barriers may be used to keep vehicles from rolling too far forward (or backward) into another row of vehicles and may stop a vehicle from moving too far when the wheels encounter the barrier. A parking barrier may include, or be referred to herein as a parking barrier, parking chock, parking wheel stopper, curb, or the like.

When a vehicle pulls into or approaches a parking stall the user or driving system may be able to identify a parking barrier and park accordingly. The user or driving system may pull in to an approximate position without hitting the parking barrier or pull forward until the wheels bump the barrier. However, after parking or entering a parking stall, parking barriers are often out of view from a driver or from sensors of a vehicle. After parking, and/or after exiting or turning off the vehicle, the user or a driving system may not be able to directly see or detect the parking barrier. For example, a human driver may be able to exit the vehicle and walk to the front of the vehicle to see if there is a parking chock, but may not be able to see from within a cab of the vehicle. Similarly, sensors of an autonomous driving system or driving assistance system may be directed to view regions near a vehicle, but a region under or on the ground near a front or rear bumper may be outside the field of view of the sensors. Thus, a driving system or driver is at risk of not detecting the barrier or chock.

If a driver or driving system does not detect the presence of the chock, significant damage may result if the vehicle is driven forward over the chock or parking barrier. For example, if the vehicle is driven forward over a barrier, the barrier may scrape an underside of the vehicle or chassis, or the vehicle may become high-centered on the barrier, leading to vehicle damage or leaving a user without transportation.

In view and recognition of the foregoing, the present application discloses systems, methods, and devices for determining whether a barrier or chock is present. In one embodiment, the presence of the barrier or chock is determined based on a drive history for the vehicle. For example, a system may reference a drive history to see whether a barrier or chock is present at a current parking stall of the vehicle. In one embodiment, the parking chock is detected by the system upon entry into the parking stall and entered into a drive history database. The vehicle may then be turned off and the driver may exit the vehicle. After a period of time, the driver may re-enter the car, start the vehicle (or drive control system), and is reminded by the vehicle (e.g., based on the drive history) if a parking chock is present. If a parking chock is present, the driver may reverse out of the stall, otherwise the driver may simply drive forward. An autonomous vehicle may perform a similar scenario except the autonomous vehicle may choose the appropriate path to exit the stall based on the drive history. Thus, it will be understood that the present disclosure applies to all vehicles, whether autonomous or manually operated.

Prior to the present disclosure, if the driver did not remember or notice whether a chock is present, the driver would need to exit the vehicle and look for a possible chock, or guess (or fail to check) and deal with the consequences. Additionally, prior to the present disclosure an autonomous vehicle had the options of either backing up a bit, "look" and then proceeding forward, or simply always reverse out of a parking stall.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Referring now to the figures, FIG. 1 illustrates a vehicle control system 100 that includes an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking) but may provide notifications and alerts to assist a human driver in driving safely. The automated driving/assistance system 102 includes a parking barrier component 104, which may determine that a parking barrier or chock is present and may notify or alert a user or the automated driving/assistance system 102 of the presence of the parking barrier.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR systems 108, one or more camera systems 110, a GPS 112, and/or ultrasound systems 114. The vehicle control system 100 may include a data store 116 for storing relevant or useful data for navigation and safety such as a driving history, map data, or other data. The vehicle control system 100 may also include a transceiver 118 for wireless communication with a mobile or wireless network, other vehicles, infrastructure, or any other communication system. The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. The display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation. For example, the parking barrier component 104 may be separate from the automated driving/assistance system 102 and the data store 116 may be included as part of the automated driving/assistance system 102 and/or part of the parking barrier component 104.

The radar system 106 may include any radar system well known in the art. Radar system operations and performance is generally well understood. In general, a radar system 106 operates by transmitting radio signals and detecting reflections off objects. In ground applications, the radar may be used to detect physical objects, such as other vehicles, parking barriers or parking chocks, landscapes (such as trees, cliffs, rocks, hills, or the like), road edges, signs, buildings, or other objects. The radar system 106 may use the reflected radio waves to determine a size, shape, distance, surface texture, or other information about a physical object or material. For example, the radar system 106 may sweep an area to obtain data or objects within a specific range and viewing angle of the radar system 106. In one embodiment, the radar system 106 is configured to generate perception information from a region near the vehicle, such as one or more regions nearby or surrounding the vehicle. For example, the radar system 106 may obtain data about regions of the ground or vertical area immediately neighboring or near the vehicle. The radar system 106 may include one of many widely available commercially available radar systems. In one embodiment, the radar system 106 may provide perception data including a two dimensional or three-dimensional map or model to the automated driving/assistance system 102 for reference or processing.

The LIDAR system 108 may include any LIDAR system known in the art. Principles of operation and performance of LIDAR systems are generally well understood. In general, the LIDAR system 108 operates by emitting visible wavelength or infrared wavelength lasers and detecting reflections of the laser light off objects. In ground applications, the lasers may be used to detect physical objects, such as other vehicles, parking barriers or parking chocks, landscapes (such as trees, cliffs, rocks, hills, or the like), road edges, signs, buildings, or other objects. The LIDAR system 108 may use the reflected laser light to determine a size, shape, distance, surface texture, or other information about a physical object or material. For example, the LIDAR system 108 may sweep an area to obtain data or objects within a specific range and viewing angle of the LIDAR system 108. For example, the LIDAR system 108 may obtain data about regions of the ground or vertical area immediately neighboring or near the vehicle. The LIDAR system 108 may include one of many widely available commercially available LIDAR systems. In one embodiment, the LIDAR system 108 may provide perception data including a two dimensional or three-dimensional model or map of detect objects or surfaces.

The camera system 110 may include one or more cameras, such as visible wavelength cameras or infrared cameras. The camera system 110 may provide a video feed or periodic images, which can be processed for object detection, road identification and positioning, or other detection or positioning. In one embodiment, the camera system 110 may include two or more cameras, which may be used to provide ranging (e.g., detect a distance) for objects within view The GPS system 112 is one embodiment of a positioning system that may provide a geographical location of the vehicle based on satellite or radio tower signals. GPS systems 112 are well known and widely available in the art. Although GPS systems 112 can provide very accurate positioning information, GPS systems 112 generally provide little or no information about distances between the vehicle and other objects. Rather, they simply provide a location, which can then be compared with other data, such as maps, to determine distances to other objects, roads, or locations of interest.

The ultrasound system 114 may be used to detect objects or distances between a vehicle and objects using ultrasound waves. For example, the ultrasound system 114 may emit ultrasound waves from a location on or near a bumper or side panel location of a vehicle. The ultrasound waves, which can travel short distances through air, may reflect off other objects and be detected by the ultrasound system 114. Based on an amount of time between emission and reception of reflected ultrasonic waves, the ultrasound system 114 may be able to detect accurate distances between a bumper or side panel and any other objects. Due to its shorter range, ultrasound systems 114 may be more useful to detect objects during parking or detect imminent collisions during driving.

The data store 116 stores map data, a driving history, and other data, which may include other navigational data, settings, or operating instructions for the automated driving/assistance system 102. The map data may include location data, such as GPS location data, for roads, parking lots, parking stalls, or other places where a vehicle may be driven or parked. For example, the location data for roads may include location data for specific lanes, such as lane direction, merging lanes, highway or freeway lanes, exit lanes, or any other lane or division of a road. The location data may also include locations for each parking stall in a parking lot of for parking stalls along a road. In one embodiment, the map data includes location data about one or more structures or objects on or near the roads or parking locations. For example, the map data may include data regarding GPS sign location, bridge location, building or other structure location, or the like. In one embodiment, the map data may include precise location data with accuracy within a few meters or within sub meter accuracy. The map data may also include location data for paths, dirt roads, or other roads or paths, which may be driven by a land vehicle.

The driving history (or drive history) may include location data for past trips or parking locations of the vehicle. For example, the driving history may include GPS location data for the previous trips or paths taken. In one embodiment, the driving history may include information about the location of parking barriers or parking chocks. For example, each time a vehicle is parked the parking barrier component 104 may be used to detect a parking barrier or chock and store an indication in the data store 116 of the existence or presence of the parking barrier or chock. As another example, the driving history may include distance or relative location data with respect to lane lines, signs, road border lines, or other objects or features on or near the roads. The distance or relative location data may be determined based on GPS data, radar data, LIDAR data, camera data, or other sensor data gathered during the previous or past trips taken by the vehicle. This driving history data may be logged by the automated driving/assistance system 102 for future use if/when sensor data fails. For example, by saving detailed lane location, sign location, or other data, the automated driving/assistance system 102 may be able to determine an extremely precise location based on radar data only (or a combination of radar and any other available location/navigation data). In one embodiment, the automated driving/assistance system 102 is configured to log driving data to the data store 116 for and during any trips or drives taken by the vehicle.

The transceiver 118 is configured to receive signals from one or more other data or signal sources. The transceiver 118 may include one or more radios configured to communicate according to a variety of communication standards and/or using a variety of different frequencies. For example, the transceiver 118 may receive signals from other vehicles. Receiving signals from another vehicle is reference herein as vehicle-to-vehicle (V2V) communication. In one embodiment, the transceiver 118 may also be used to transmit information to other vehicles to potentially assist them in locating vehicles or objects. During V2V communication the transceiver 118 may receive information from other vehicles about their locations, other traffic, accidents, road conditions, the locations of parking barriers or parking chocks, or any other details that may assist the vehicle and/or automated driving/assistance system 102 in driving accurately or safely.

The transceiver 118 may receive signals from other signal sources that are at fixed locations. Infrastructure transceivers may be located at a specific geographic location and may transmit its specific geographic location with a time stamp. Thus, the automated driving/assistance system 102 may be able to determine a distance from the infrastructure transceivers based on the time stamp and then determine its location based on the location of the infrastructure transceivers. In one embodiment, receiving or sending location data from devices or towers at fixed locations is referenced herein as vehicle-to-infrastructure (V2X) communication. In one embodiment, the term V2X communication may also encompass V2V communication.

In one embodiment, the transceiver 118 may send and receive location data via a mobile network or cell connection. For example, the transceiver 118 may receive updated location data for a specific area as a vehicle travels along a roadway. Similarly, the transceiver 118 may receive historical driving data for a parent vehicle or other vehicles that have driven along a road or parked in a parking lot at that location or at that stall. For example, the transceiver 118 may receive data that indicates locations of signs, parking barriers or parking chocks, or other objects, which may be detectable using a radar system 106, LIDAR system 108, camera system 110, GPS system 112, or ultrasound system 114. If the transceiver 118 is able to receive signals from three or more infrastructure transceivers, the automated driving/assistance system 102 may be able to triangulate its geographic location.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118.

Figure 2:
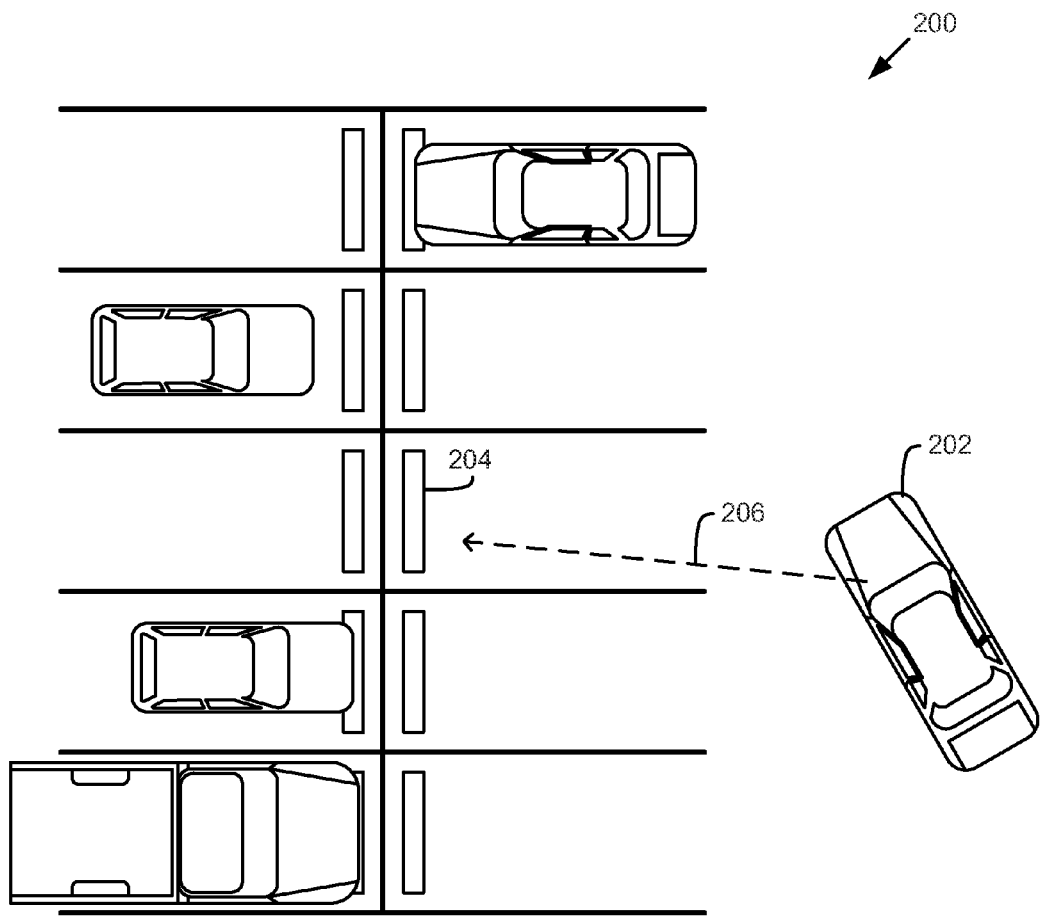
FIG. 2 is a schematic top view diagram illustrating a parking lot, according to one embodiment.

Referring now to FIG. 2, a top view diagram of a parking lot 200 with a plurality of parking locations is shown. A vehicle 202 is shown as it is approaching or pulling into a specific parking stall having a parking barrier 204. The parking barrier 204 includes a parking chock. Embodiments of parking chocks include concrete, rubber, or other barriers, which are placed at parking locations to prevent vehicles from pulling or rolling too far in one or more directions. The parking lot 200 includes a parking barrier 204 for each parking stall. However, some parking stalls may be missing a parking barrier 204 or the parking stalls may be inconsistent with inclusion of parking barriers 204 so that a driver or system cannot assume that a specific parking stall does or does not include a parking barrier 204 based on other parking stalls. According to one embodiment, as indicated by line 206, as the vehicle 202 pulls into the parking stall the parking barrier component 104 detects the presence of the parking barrier 204 and may store an indication that the parking barrier 204 is present in memory.

Once the vehicle 202 is parked, the parking chock 204 may no longer be visible to a human within the vehicle 202 or to one or more sensors of the vehicle 202 (such as components 106-110 and/or 114). When the vehicle is turned off, or a driver leaves the vehicle, the indication of the presence of the parking barrier 204 is retained in memory. Upon return of a driver, upon starting the vehicle 202, or upon occurrence of another event that indicates the vehicle 202 is leaving or preparing to leave the parking stall, the parking barrier component 104 may retrieve the indication of the presence of the parking barrier 204 and remind a driver or automated driving/assistance system 102 of the presence of the barrier 204. Thus, the system may store data regarding the existence of a parking barrier 204 when entering a parking stall and, at a later time, reminding the driver or automated driving system of the parking barrier 204 when preparing to exit the parking stall. Thus, sensors may be used to detect the presence of the barrier 204, store an indication of the presence of the barrier 204, and then tell the user that the barrier 204 is or is not present. For example, the user may be notified when the user starts up the vehicle again, gets back in the vehicle, or otherwise indicates that they are ready to drive. Similarly, an automated system may check the drive history to determine whether the barrier 204 is there.

Although FIG. 2 illustrates a plan view of a parking lot, vehicles may be parked in a wide variety of locations where parking barriers 204 or parking chocks may be present. For example, road-side parking, driveway parking, or any other parking location may also include a parking barrier, parking chock, wheel stop, curb, or other object to define parking locations or parking stalls.

Figure 3:
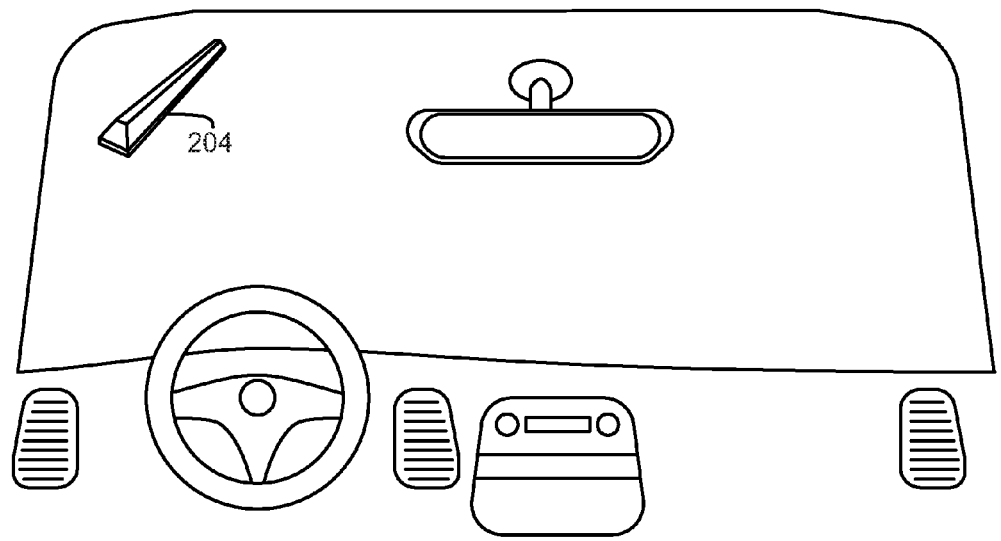
FIG. 3 is a schematic diagram illustrating a view of a parking barrier or parking chock through a windshield of a vehicle.

FIG. 3 illustrates a cab view through a windshield of the vehicle 202 as the vehicle 202 approaches the parking barrier 204. As the vehicle 202 pulls into the parking stall the parking barrier 204 is visible to a driver (and/or one or more sensors). During the approach, the parking barrier component 104 may detect the presence of the parking barrier 204 and determine a location of the vehicle 202 in relation to the parking barrier 204 as the vehicle 202 parks. For example, after the parking barrier 204 is out of view, the parking barrier component 104 may track movement of the vehicle 202 and determine a location of the parking barrier 204 based on the relative position of the parking barrier 204 when it was within view.

Figure 4:
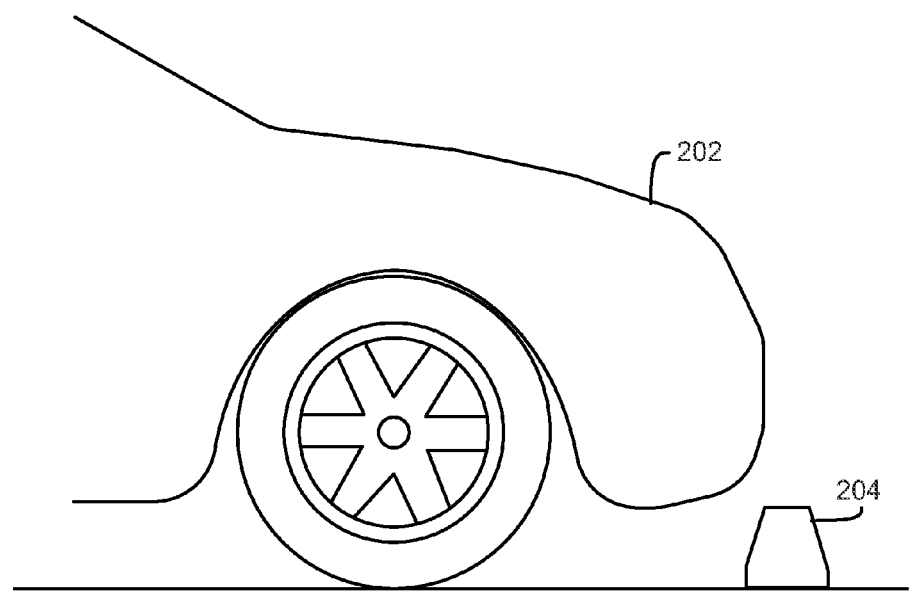
FIG. 4 is a schematic diagram illustrating a side view of a vehicle parked near a parking barrier or parking chock.

FIG. 4 illustrates a side view of the vehicle 202 and parking barrier 204 after the vehicle 202 has parked. The parking barrier 204 is not visible through a windshield of the vehicle 202 and one or more sensors mounted on or near the hood or roof of the vehicle 202 also may not be able to detect the parking barrier 204.

Figure 5:
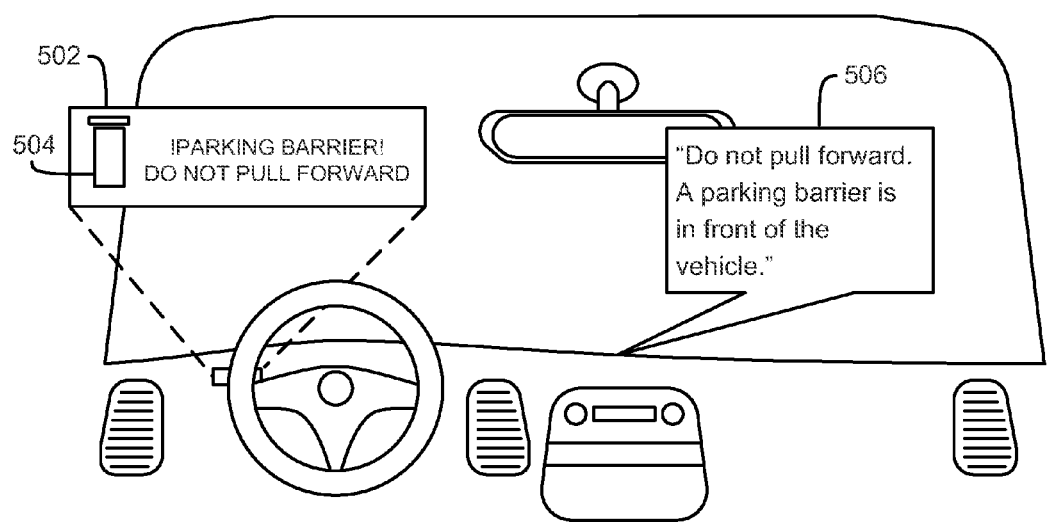
FIG. 5 is a schematic diagram illustrating notifications provided to a driver or passenger of a vehicle.

FIG. 5 illustrates a cab view through a windshield of the vehicle after the vehicle 202 has been parked behind the parking barrier 204 (not visible in FIG. 5). To a driver, or one or more sensors, the likely location of a parking barrier 204 is not visible. Thus, a user or driving system is in danger of driving the vehicle 202 forward over the parking barrier 204, which may cause damage to the vehicle 202 or cause the vehicle 202 to get high centered or stuck. However, a notification may be provided to the driver (or automated driving/assistance system 102) by the parking barrier component 104 that the parking barrier 204 is present. Specifically, a visual indication 502 in the dash is illustrated with an icon 504 indicating the presence of the parking barrier 204 with the words "!PARKING BARRIER! DO NOT PULL FORWARD." It will be appreciated that other written indication may be provided to alert a driver of the presence of the parking barrier 204. The icon 504 stylistically and visually indicates the vehicle 202 with a barrier 204 in front of it. In one embodiment, the barrier in the icon 504 may be a different color than the vehicle to indicate that it could be a hazard. The icon 504 may change if there is a barrier behind the vehicle. For example, the barrier may be depicted below rather than above the stylistic vehicle in the icon 504. An audio message 506 (e.g., "Do not pull forward. A parking barrier is in front of the vehicle.") may be played audibly so that a driver hears the voice instructions even if the driver does not see the visual indication 502. The audio and visual messages of FIG. 5 are given by way of example only and may vary considerably in different embodiments.

Figure 6:
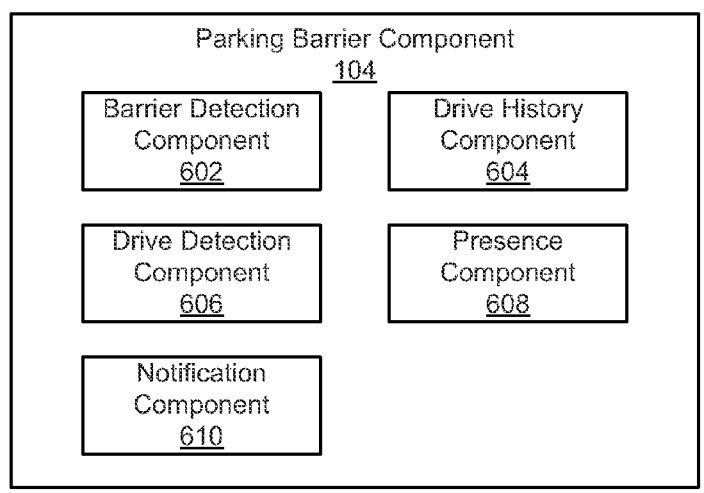
FIG. 6 is a schematic block diagram illustrating example components of a parking barrier component, according to one implementation.

FIG. 6 is a block diagram illustrating example components of the parking barrier component 104. In the depicted embodiment, the parking barrier component 104 includes a barrier detection component 602, a drive history component 604, a drive detection component 606, a presence component 608, and a notification component 610. The components 602-610 are given by way of illustration only and may not all be included in all embodiments. In fact, some embodiments may include only one or any combination of two or more of the components 602-610. Some of the components 602-610 may be located outside the parking barrier component 104, such as within the automated driving/assistance system 102 or elsewhere.

The barrier detection component 602 is configured to detect a parking barrier 204, such as a parking chock. In one embodiment, the barrier detection component 602 is configured to detect a parking barrier 204 based on information from one or more sensors that are obtaining data about objects near the vehicle 202. In one embodiment, the sensors have a position or field of view that cannot capture areas under or within a specific range of an edge of the vehicle 202. For example, the sensors may not be able to detect a barrier 204 or chock within a threshold distance of a couple feet, a foot or less, or a few inches or less of a bumper of the vehicle 202. In one embodiment, the sensors may have a blind spot under the vehicle, including under a front or rear bumper.

In one embodiment, the barrier detection component 602 is configured to detect a parking barrier 204 during entry of the vehicle 202 into, or approach of the vehicle 202 toward, the parking location. For example, as the vehicle 202 drives through a parking lot the barrier detection component 602 may detect the presence and/or location of parking barriers 204. As the vehicle 202 pulls into a specific parking stall or parking location, the barrier detection component 602 may detect the presence of a parking barrier 204 and may determine the location of the parking barrier 204. As the vehicle 202 pulls into the parking location or stall and parks, the barrier detection component 602 may determine the location of the barrier 204 in relation to the parked vehicle 202. For example, the barrier detection component 602 may determine that the parking barrier 204 is in front of or behind the vehicle 202. In one embodiment, after initial detection and even when the barrier 204 is not within view, the barrier detection component 602 may determine or predict a location of the barrier 204 in relation to the vehicle 202. For example, as the vehicle 202 pulls into the parking location or stall, the parking barrier 204 may be out of sight, but its location can be estimated based on the last location detected by the sensors and movement(s) of the vehicle 202 since the last detection.

The drive history component 604 is configured to store an indication of the presence of the parking barrier 204. For example, the drive history component 604 may update the driving history in the data store 116 to include an indication that the parking barrier 204 is present at the specific or current parking stall. In one embodiment, the drive history 604 may be updated to indicate a position of the parking barrier 204 with respect to the vehicle 202. For example, the drive history may include information about whether the barrier 204 is in front of or behind the vehicle 202.

The drive detection component 606 is configured to determine whether the vehicle 202 or a driver is about to drive away from the parking stall. For example, the drive detection component 606 may determine that the vehicle 202 or driver is exiting or preparing to exit a parking location. The drive detection component 606 may determine that the vehicle 202 is exiting or preparing to exit the parking location based on the detection of a human entering into the vehicle 202. For example, a motion sensor, weight sensor, door sensor, and/or other sensor may be used to determine whether a user has left and/or entered the vehicle 202. The drive detection component 606 may determine that the vehicle 202 is exiting or preparing to exit the parking location based on the detection that the vehicle 202 has been started. For example, a sensor may report to the drive detection component 606 that an engine of the vehicle 202 has been started or that the vehicle 202 has been powered on. Electric vehicles may not need to be started in the same sense as gasoline vehicles, but may still be switched on or placed in a drive mode, which can be detected.

The drive detection component 606 may determine that the vehicle 202 is exiting or preparing to exit the parking location based on detecting the presence of a key within the vehicle 202. For example, the drive detection component 606 may receive a signal indicating that the key has been inserted into an ignition of the vehicle 202. As another example, with push button vehicles or vehicles that don't require a key in the ignition, the drive detection component 606 may determine that a key is present or within a specific distance of a proximity sensor of the vehicle 202. The drive detection component 606 may determine that the vehicle 202 is exiting or preparing to exit the parking location based on determining that the vehicle has been switched into a drive gear or drive mode. For example, the drive detection component 606 may detect that the vehicle has been shifted from park or neutral to first gear or reverse. The drive detection component 606 may determine that the vehicle 202 is exiting or preparing to exit the parking location based on an indication from the automated driving system that the automated driving system is preparing to exit the parking location. For example, the automated driving/assistance system 102 may send a message or query to the parking barrier component 104 indicating that it is preparing to exit the parking stall. In one embodiment, the drive detection component 606 may determine that the vehicle 202 is exiting or preparing to exit the parking location based on detecting a powering on of a driving control system (e.g., a boot up of a computing system that controls the vehicle or drive control system, such as vehicle control system 100).

The presence component 608 is configured to determine whether a parking barrier 204 is present at the current parking location of the vehicle 202. In one embodiment, the presence component 608 is configured to determine whether the parking barrier 204 is present in response to detecting that the vehicle 202 is about to exit the parking stall. In one embodiment, the presence component 608 may determine that the vehicle 202 is currently parked in the parking stall. For example, the presence component 608 may determine that the vehicle 202 is located in the parking location in response to detecting one or more of an entry of a user into a driver's seat of the vehicle 202, switching the vehicle 202 into a drive gear, and starting the vehicle 202. In one embodiment, the presence component 608 is configured to determine whether the parking barrier 204 is present in response to determining that the vehicle 202 is currently parked at the parking location.

In one embodiment, the presence component 608 is configured to determine whether a parking barrier 204 is present based on a drive history database. For example, the presence component 608 may retrieve an indication of the presence of the parking barrier 204 from the memory, such as from the data storage 116. In one embodiment, the presence component 608 may determine a location of the parking barrier 204 or chock in relation to the vehicle 202. For example, the parking barrier 204 may be present in front of or behind the parking location, and this information may be retrieved from memory.

The notification component 610 is configured to provide an indication that the parking barrier 204 is present to a human driver or automated driving system of the vehicle 202. For example, if a human driver is driving the vehicle 202, a visual or audio notification may be provided within the cab of the vehicle 202 (see FIG. 5). In one embodiment, the notification component 610 may provide an indication by sending a signal or message to the automated driving system that the barrier 204 is or is not present. In one embodiment, the notification component 610 provides an indication of a location of the parking barrier 204. For example, the notification component 610 may indicate that the parking barrier 204 or chock is in front of, behind, or at some other location with respect to the vehicle 202.

Figure 7:
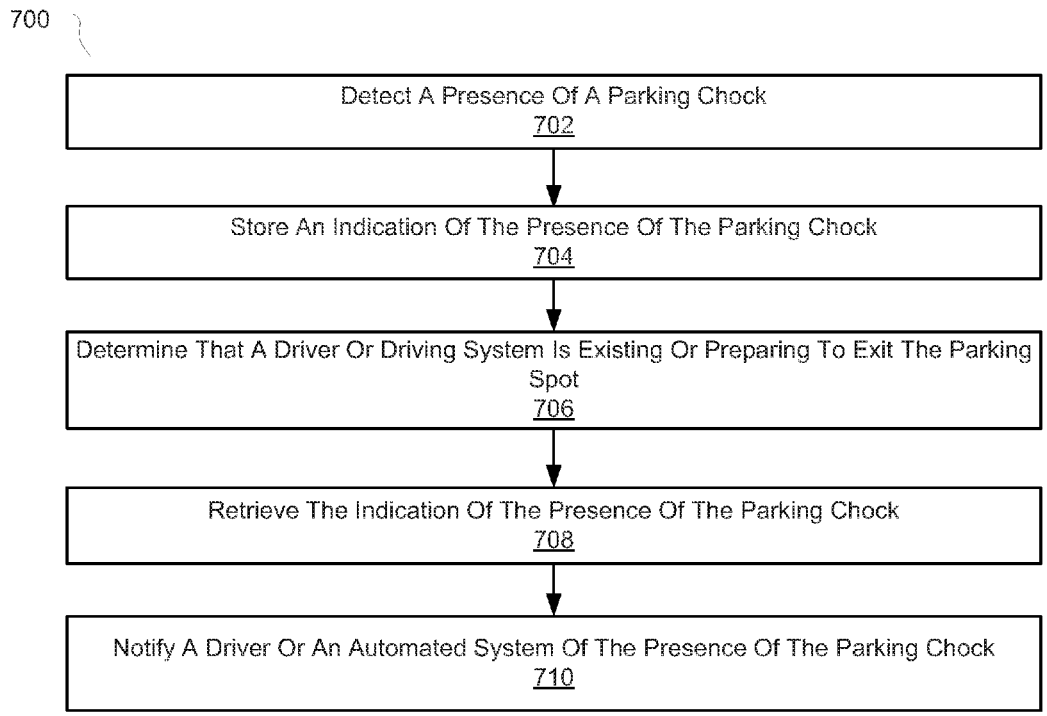
FIG. 7 is a schematic flowchart diagram illustrating a method for detecting and avoiding a parking barrier, according to one implementation.

Referring now to FIG. 7, a schematic flow chart diagram of a method 700 for the presence of and avoiding a parking barrier 204 or chock is illustrated. The method 700 may be performed by an automated driving/assistance system or a parking barrier component, such as the automated driving/assistance system 102 of FIG. 1 or the parking barrier component 104 of FIG. 1 or 6.

The method 700 begins and the barrier detection component 602 detects a presence of a parking chock or parking barrier during entry of the vehicle into a parking stall at 702. The drive history component 604 stores, in memory, an indication of the presence of the parking chock or parking barrier near the parking stall at 704. The drive detection component 606 determines that a driver or driving system of the vehicle is exiting or preparing to exit the parking stall at 706. The presence component 608 retrieves the indication of the presence of the parking chock or parking barrier from the memory at 708. The notification component 610 notifies a driver or an automated driving system of the vehicle of the presence of the parking chock or parking barrier at 710.

EXAMPLES

The following examples pertain to further embodiments.

Example 1 is a system that includes a drive detection component, a presence component, and a notification component. The drive detection component is configured to determine that a vehicle or driver is exiting or preparing to exit a parking location. The presence component is configured to determine, from a drive history database, whether a parking barrier is present in front of or behind the parking location. The notification component is configured to provide an indication that the parking barrier is present to a human driver or automated driving system of the vehicle.

In Example 2, the presence component of Example 1 is configured to determine whether the parking barrier is present in response to determining that the vehicle is currently parked at the parking location.

In Example 3, the notification component is in any of Examples 1-2 is configured to provide one or more of a visual indication and an audio indication of the presence of the parking barrier to a human driver.

In Example 4, the notification component in any of Example 1-3 is configured to provide the indication by sending a message to the automated driving system.

In Example 5, the notification component in any of Examples 1-4 is further configured to provide an indication of a location of the parking barrier.

In Example 6, the drive detection component in any of Examples 1-5 is configured to determine that the vehicle is exiting or preparing to exit the parking location based on one or more of: detecting an entry of a human into the vehicle; detecting that the vehicle has been started; detecting the presence of a key within the vehicle; determining that the vehicle has been switched into a drive gear or drive mode; and receiving an indication from the automated driving system that the automated driving system is preparing to exit the parking location.

In Example 7, the system of any of Examples 1-6 includes one or more sensors for obtaining data about objects near the vehicle and a barrier detection component configured to detect a parking barrier during entry of the vehicle into, or approach of the vehicle toward, the parking location.

In Example 8, the system of Example 7 further includes a drive history component configured to update the drive history to include an indication that the parking barrier is present.

In Example 9, the sensors of any of Examples 7-8 have a position or field of view that cannot capture areas under or within a specific range of an edge of the vehicle.

Example 10 is a method that includes: detecting a presence of a parking chock or parking barrier during entry of the vehicle into a parking stall; storing, in memory, an indication of the presence of the parking chock near the parking stall; determining that a driver or driving system of the vehicle is exiting or preparing to exit the parking stall; and in response to determining that the vehicle is about to exit the parking stall retrieving the indication of the presence of the parking chock or parking barrier from the memory and notifying a driver or an automated driving system of the vehicle of the presence of the parking chock or parking barrier.

In Example 11, determining that a driver or driving system of the vehicle is exiting or preparing to exit the parking stall in Example 10 includes one or more of: detecting an entry of a human into the vehicle; detecting that the vehicle has been started; detecting the presence of a key within the vehicle; determining that the vehicle has been switched into a drive gear or drive mode; and receiving an indication from the automated driving system that the automated driving system is preparing to exit the parking location.

In Example 12, the indication of the presence of the parking chock or parking barrier in any of Examples 10-11 further includes an indication of a location of the parking chock or parking barrier with respect to the vehicle.

In Example 13, notifying the driver or the automated driving system in any of Examples 10-12 includes notifying the driver or the automated driving system of the location of the parking chock or parking barrier with respect to the vehicle.

In Example 14, the method of any of Examples 10-13 includes determining that the vehicle is currently parked in the parking stall.

In Example 15, notifying a driver in any of Examples 10-14 includes provide one or more of a visual indication and an audio indication of the presence of the parking chock or parking barrier to a human driver.

In Example 16, notifying the automated driving system in any of Examples 10-15 includes sending a message to the automated driving system.

Example 17 is computer readable storage media storing instructions that, when executed by one or more processors, cause the processors to: obtain sensor data for a objects in a region near a vehicle during entry of the vehicle in a parking location; process the sensor data to determine that a parking barrier is present at a front or rear of the parking location; update a driving history to indicate the location of the parking barrier; detect one or more of an entry of a user into a driver's seat of the vehicle, a switching the vehicle into a drive gear, and starting the vehicle; notify a driver or driving control system of the vehicle that the parking barrier is present at the front or rear of the parking location.

In Example 18, detecting starting of the vehicle in Example 17 includes detecting one or more of starting an engine of the vehicle and powering on of the driving control system.

In Example 19, the sensor data in any of Examples 17-18 does not provide data for a region within a threshold distance of a front or rear bumper of the vehicle.

In Example 20, the instructions in any of Examples 17-19 further cause the processor to determine that the vehicle is located in the parking location in response to detecting one or more of an entry of a user into a driver's seat of the vehicle, a switching the vehicle into a drive gear, and starting the vehicle.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

Embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
a drive detection component configured to determine that a vehicle or driver is exiting or preparing to exit a parking location;
a presence component configured to determine, from a drive history database, whether a parking barrier is present at the parking location, wherein the presence component determines whether the parking barrier is present in response to determining that the vehicle or driver is exiting or preparing to exit the parking location; and
a notification component configured to provide an indication that the parking barrier is present to a human driver or an automated driving system of the vehicle.

2. The system of claim 1, wherein the presence component is configured to determine whether the parking barrier is present in response to determining that the vehicle is currently parked at the parking location.

3. The system of claim 1, wherein the notification component is configured to provide one or more of a visual indication and an audio indication of the presence of the parking barrier to a human driver.

4. The system of claim 1, wherein the notification component is configured to provide the indication by sending a message to the automated driving system.

5. The system of claim 1, wherein the notification component is further configured to provide an indication of a location of the parking barrier.

6. The system of claim 1, wherein the drive detection component is configured to determine that the vehicle is exiting or preparing to exit the parking location based on one or more of:
detecting an entry of a human into the vehicle;
detecting that the vehicle has been started;
detecting the presence of a key within the vehicle;
determining that the vehicle has been switched into a drive gear or drive mode; and
receiving an indication from the automated driving system that the automated driving system is preparing to exit the parking location.

7. The system of claim 1, further comprising one or more sensors for obtaining data about objects near the vehicle and a barrier detection component configured to detect the parking barrier during entry of the vehicle into, or approach of the vehicle toward, the parking location.

8. The system of claim 7, further comprising a drive history component configured to update the drive history to include an indication that the parking barrier is present.

9. The system of claim 7, wherein the sensors have a position or field of view that cannot capture areas under or within a specific range of an edge of the vehicle.

10. A method comprising:
detecting a presence of a parking barrier during entry of a vehicle into a parking stall;
storing, in memory, an indication of the presence of the parking barrier near the parking stall;
determining that a driver or an automated driving system of the vehicle is exiting or preparing to exit the parking stall; and
in response to determining that the vehicle is about to exit the parking stall:
retrieving the indication of the presence of the parking barrier from the memory; and
notifying the driver or the automated driving system of the vehicle of the presence of the parking barrier.

11. The method of claim 10, wherein determining that a driver or automated driving system of the vehicle is exiting or preparing to exit the parking stall comprises one or more of:
detecting an entry of a human into the vehicle;
detecting that the vehicle has been started;
detecting the presence of a key within the vehicle;
determining that the vehicle has been switched into a drive gear or drive mode; and
receiving an indication from the automated driving system that the automated driving system is preparing to exit the parking stall.

12. The method of claim 10, wherein the indication of the presence of the parking barrier further comprises an indication of a location of the parking barrier with respect to the vehicle.

13. The method of claim 12, wherein notifying the driver or the automated driving system comprises notifying the driver or the automated driving system of the location of the parking barrier with respect to the vehicle.

14. The method of claim 10, further comprising determining that the vehicle is currently parked in the parking stall.

15. The method of claim 10, wherein notifying the driver comprises providing one or more of a visual indication and an audio indication of the presence of the parking barrier to a human driver.

16. The method of claim 10, wherein notifying the automated driving system comprises sending a message to the automated driving system.

17. Computer readable storage media storing instructions that, when executed by one or more processors, cause the processors to:
obtain sensor data for a plurality of objects in a region near a vehicle during entry of the vehicle into a parking location;
process the sensor data to determine that a parking barrier is present at a front or rear of the parking location;
update a driving history to indicate the location of the parking barrier;
detect one or more of an entry of a user into a driver's seat of the vehicle, a switching the vehicle into a drive gear, and starting the vehicle;
determine that the vehicle or driver is exiting or preparing to exit the parking location in response to detecting one or more of the entry of a user into a driver's seat of the vehicle, the switching the vehicle into a drive gear, and the starting the vehicle; and
notify a driver or an automated driving control system of the vehicle that the parking barrier is present at the front or rear of the vehicle.

18. The computer readable storage media of claim 17, wherein detecting starting of the vehicle comprises detecting one or more of starting an engine of the vehicle and powering on of the automated driving control system.

19. The computer readable storage media of claim 17, wherein the sensor data does not provide data for a region within a threshold distance of a front or rear bumper of the vehicle.

20. The computer readable storage media of claim 17, wherein the instructions further cause the processor to determine that the vehicle is located in the parking location in response to detecting one or more of an entry of a user into a driver's seat of the vehicle, a switching the vehicle into a drive gear, and starting the vehicle.

* * * * *